United States Patent [19]

Bishop et al.

[11] Patent Number: 4,844,604
[45] Date of Patent: Jul. 4, 1989

[54] OPTICAL FIBER BUNDLING MATERIAL AND BUNDLED OPTICAL FIBERS

[75] Inventors: Timothy Bishop, Algonquin, Ill.; Tohru Ohtaka, Kawaski, Japan; Keiichi Bessho, Yokkaichi, Japan; Takeshi Sugimoto; Katsutoshi Igarashi, both of Yokohama, Japan

[73] Assignee: DeSoto, Inc., Des Plaines, Ill.

[21] Appl. No.: 206,756

[22] Filed: Jun. 15, 1988

[30] Foreign Application Priority Data

Nov. 13, 1987 [JP] Japan ................................. 62-287195

[51] Int. Cl.$^4$ ................................................ G02B 6/04
[52] U.S. Cl. ............................... 350/96.24; 350/96.34; 522/97
[58] Field of Search ......................... 350/96.34, 96.24; 522/97, 96; 438/336

[56] References Cited

U.S. PATENT DOCUMENTS

| 4,443,518 | 4/1984 | Martins et al. | 428/336 |
| 4,443,519 | 4/1984 | Donermeyer et al. | 428/336 |
| 4,482,604 | 11/1984 | Donermeyer et al. | 428/336 |
| 4,691,989 | 9/1987 | Blyler, Jr. | 350/96.34 X |

Primary Examiner—John D. Lee
Assistant Examiner—John Ngo
Attorney, Agent, or Firm—Dressler, Goldsmith, Shore, Sutker, & Milnamow, Ltd.

[57] ABSTRACT

A curable resin composition adapted for bundling coated optical fibers comprises:
(A) polyetherpolyurethanes of at least one kind having an ethylenically unsaturated group and containing from 40% to 85%, by weight, of a tetramethyleneoxy structure in the entire structure thereof;
(B) ethylenically unsaturated monomer; and
(C) a photopolymerization initiator. This resin composition, when cured, has a coefficient of dynamic friction with polyethylene of not more than 0.4, and is thus specially adapted for use in holding together coated optical fibers in a tape-like structure.

16 Claims, No Drawings

OPTICAL FIBER BUNDLING MATERIAL AND BUNDLED OPTICAL FIBERS

DESCRIPTION

1. Technical Field

This invention relates to a curable bundling material of optical fiber and to bundled optical fibers in which the coated optical fibers are held together by the cured bundling material.

2. Description of the Invention

The present invention relates to bundled optical fibers which are characterized especially by reduced coefficients of friction between the cured bundles and between the cured bundles and the polyethylene-surfaced structures with which they are associated.

[PRIOR ART]

Conventionally, a tape optical fiber structure (or a tape core-strand) is known in the art, which is fabricated by aligning on a plane a plurality of optical fiber elemental strands (which are usually coated with primary and secondary resin coatings) and solidifying them by a resin so that the strands may take a tape-like structure with a rectangular cross-section. The material for bundling the optical fiber elemental strands and making them into such a tape-like structure is called a bundling material.

Thermoplastic resins, such as nylon or the like, have conventionally been used as such a bundling material. More recently, however, use of resins for a bundling material which are curable by radiation such as ultraviolet-radiation has been studied in order to improve the productivity.

[PROBLEMS SOUGHT TO BE DISSOLVED BY THE INVENTION]

Following characteristics are listed which are required for a curable resin used as a bundling material:

(1) The resin is rapidly curable and provides good productivity.

(2) The cured material has a sufficient strength and flexibility.

(3) The cured material exhibits only small variations in its properties over a wide range of temperature.

(4) The cured material exhibits only small changes in its properties upon lapse of time and thus possesses a long-term reliability.

(5) The cured material has a good resistance against chemicals such as acids, alkalis or the like.

(6) The cured material has only a low moisture and water absorptivity.

(7) The cured material has a smooth surface with a small friction coefficient.

Among these characteristics, the last one (7) is particularly important for the curable bundling material for optical fiber. Specifically, in the well-known optical fiber cables of a slot structure which is fabricated by inserting a tape core-strand into a polyethylene slot, it is necessary in order to reduce the transmission loss of optical fiber to make the coefficient of dynamic friction as small as possible between polyethylene which is a material of a slot and the tape core-strand. Also, as the tape core-strand is subjected to a high temperature during preparation of optical fiber with a slot structure, the coefficient of dynamic friction must be small even after the materials have been subjected to such a high temperature. Moreover, the coefficient of dynamic friction between the tape core-strands must be small as well, because the transmission loss will increase when the cable is bent if the coefficient of dynamic friction between the cured material, i.e. between the tape core-strands, is large.

There is no bundling material in the art which satisfies all of the required characteristics as listed above. Particularly, importance of the above characteristic (7) in a bundling material was recognized by the present inventors for the first time. An object of this invention is therefore to provide a curable bundling material for optical fiber which satisfies all of the above characteristics.

[MEANS FOR THE SOLUTION OF THE PROBLEMS]

In view of these situations the present inventors have made extensive studies for dissolving the above problems, and found that a composition comprising polyetherpolyurethane with a specific structure, ethylenically unsaturated monomer, and a polymerization initiator can be an excellent bundling material, when the coefficient of dynamic friction between the cured material thereof and polyethylene is not more than 0.4.

Accordingly, the present invention provides a curable bundling material for optical fiber which comprises:

(a) polyetherpolyurethanes of one or more kinds having an ethylenically unsaturated group and containing 40–85% by weight of a tetramethyleneoxy structure in the entire structure thereof, (b) an ethylenically unsaturated monomer, and (c) a photopolymerization initiator; and of which cured material has a coefficient of dynamic friction with polyethylene of not more than 0.4.

The component (a) used in this invention is one or more kinds of polyetherpolurethanes having an ethylenically unsaturated group. Preferable ethylenically unsaturated groups are, for example, vinyl group, (meth)acryloyl group, (meth)acrylamide group, vinylurethane group, vinylether group, vinylsulfide group, and the like. Particularly preferable groups are (meth)acryloyl group and (meth)acrylamide group.

These polyetherpolyurethanes contain 40 to 85% by weight (hereinafter abbreviated to "%") of a tetramethyleneoxy structure in their entire structure. The content of the tetramethyleneoxy structure of less than 40% tends to raise Young's modulus of the cured material at a high temperature and is thus undesirable. If the content exceeds 85%, the composition suffers drawbacks of a high viscosity, deposition of crystals at room temperature, phase separation, or the like.

Such a tetramethyleneoxy structure of the required proportion may be contained in one kind of polyetherpoyruethane or may be contained in two or more kinds of polyetherpolyurethanes. Therefore, polyetherpolyurethanes of the component (a) contains at least one kind of polyetherpolyurethane with the tetramethyleneoxy structure.

As ether type diols constituting such a polyetherpolyurethane with a tetramethyleneoxy structure (such ether type diol is hereinafter referred to as "specific ether diols), there are (1) polytetramethylene glycol, (2) copolymer diol of tetrahydrofuran and a cyclic ether other than tetrahydrofuran, and the like. In this invention, ether type diols other than the types (1) and (2) above as well as polyether type diamines may be used together, so long as the required proportion of tetramethyleneoxy structure is contained in the polyetherpolyurethanes. They may be, for example, ethylene glycol, propylene glycol, butane diol, 1,6-hexane diol, polyethylene glycol, polypropylene glycol, alkylene oxide addition compound of bisphenol A, alkylene oxide addition compound of bisphenol F, copolymer diol of ethylene oxide/propylene oxide, and the like. Particularly preferably compounds are ethylene glycol, polypropylene glycol, alkylene oxide addition compound of bisphenol A, polyoxypropylene diamine, and polyether type diamines available in the market such as "Jeffer Amine D-230", "Jeffer Amine D-400", and "Jeffer Amine D-2000" (manufactured by Jefferson Chemical Co.).

Cyclic ethers other than tetrahydrofuran as used for the above compound (2) may be propylene oxide, ethylene oxide, butylene oxide, methyltetrahydrofuran, oxetane, substituted oxetane, oxepane, and the like. The use of propylene oxide and/or methyltetrahydrofuran is particularly preferable. These specific ether type diols may be used in combination, for example, a mixture of polytetramethylene glycol and copolymer diol of tetrahydrofuran/propylene oxide can be used.

In this invention, the number average molecular weight of polyetherpolyurethane, the component (a), is usually from 1,000 to 10,000, and preferably from 3,000 to 8,000.

Mono-functional vinyl monomers used as a component (b) of this invention include 2-hydroxyethyl (meth)acrylate, 2-hydroxypropyl (meth)acrylate, tetrahydrofurfuryl (meth)acrylate, butoxyethyl (meth)acrylate, ethyldiethylene glycol (meth)acrylate, 2-ethylhexyl (meth)acrylate, cyclohexyl (meth)acrylate, phenoxyethyl (meth)acrylate, polyethylene glycol (meth)acrylate, polypropylene glycol (meth)acrylate, methyltrimethylene glycol (meth)acrylate, isobornyl (meth)acrylate, N-vinylpyrrolidone, N-vinylcaprolactam, diacetone (meth)acrylamide, isobutoxymethyl (meth)acrylamide, N,N-dimethyl (meth)acrylamide, t-octyl (meth)acrylamide, dimethylaminoethyl (meth)acrylate, diethylaminoethyl (meth)acrylate, (meth)acryloyl morphorine, dicyclopentenyl (meth)acrylate, tricyclodecanyl (meth)acrylate, the compound represented by the following formulae (I)-(III):

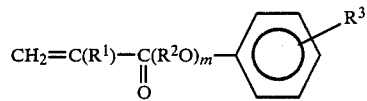

(in which $R^1$ represents a hydrogen atom or a methyl group, $R^2$ represents an alkylene group of a $C_{2-6}$, preferably $C_{2-4}$, carbon atom content, $R^3$ represents a hydrogen atom or a an alkyl group of a $C_{1-12}$, preferably $C_{1-9}$, carbon atom content, m is a value of 0-12, preferably 1-8.)

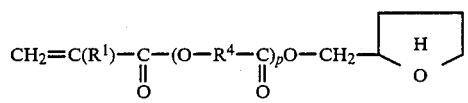

(in which $R^1$ has the same meaning as defined above, $R^4$ represents an alkylene group of a $C_{2-8}$, preferably $C_{2-5}$, carbon atom content, p is a value of 1-8, preferably 1-4.), and

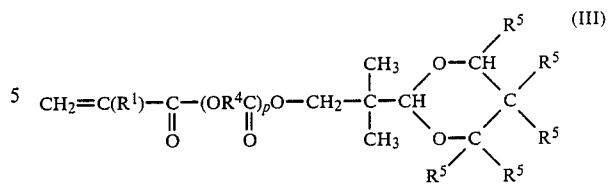

(in which $R^1$, $R^4$ and p have the same meanings as defined above, $R^5$ represents a hydrogen atom or a methyl group.)

Poly-functional vinyl monomers used as a component (b) of this invention include trimethylolpropane tri(meth)acrylate, pentaerythritol tri(meth)acrylate, ethylene glycol di(meth)acrylate, tetraethylene glycol di(meth)acrylate, polyethylene glycol di(meth)acrylate, 1,4-butanediol di(meth)acrylate, 1,6-hexanediol di(meth)acrylate, neopentyl glycol di(meth)acrylate, trimethylolpropane trioxyethyl (meth)acrylate, tricyclodecane dimethanol di(meth)acrylate, dicyclopentadiene di(meth)acrylate, dicyclopentane di(meth)acrylate, tris-(2-hydroxyethyl)isocyanulate tri(meth)acrylate, tris-(2-hydroxyethyl)isocyanulate di(meth)acrylate, epoxy(meth)acrylate formed by adding (meth)acrylate to bisphenol A diglycidylether, and the like.

Beside the above compounds, vinylethers, vinylsulfides, vinylurethanes, vinylureas, and the like are also used as a component (b) of this invention.

Among various ethylenically unsaturated monomers, particularly preferable compounds for further improving the hardening ability of the composition are the compounds represented by the above formulae (I)-(III), vinylpyrrolidone, vinylcaprolactam, and the like. In this invention, extraordinary improvement in resistance to water, hot-water, acids, and alkalis, as well as in long-term reliability, can be obtained by compounding ethylenically unsaturated monomers having an alicyclic structure. Such ethylenically unsaturated monomers having an alicyclic structure includes isobornyl (meth)acrylate, dicyclopentenyl (meth)acrylate, tricyclodecanyl (meth)acrylate, cyclohexyl (meth)acrylate, tricyclodecanedimethanol di(meth)acrylate, and the like. Among these, particularly preferable compounds are isobornyl acrylate and tricyclodecanedimethanol di(meth)acrylate.

Enumerated as examples of polymerization initiators used as the component (c) in this invention are 1-hydroxycyclohexylphenyl ketone, 2,2-dimethoxy-2-phenylacetophenone, acetophenone, benzophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzyl dimethyl ketal, 1-(4-isopropylphenyl)-2-hydroxy-2-methylpropane-1-one, 2-hydroxy-2-methyl-1-phenylpropane-1-one, thioxanthone compounds, 2-methyl-1-[4-(methylthio)phenyl]-2-morphorino-propane-1-one, 2,4,6-trimethylbenzoildiphenylphosphine oxide, and the like. Particularly preferable polymerization initiators are 1-hydroxycyclohexylphenyl ketone, benzyl methyl ketal, 2-methyl-1-[4-(methylthio)phenyl]-2-morphorino-propane-1-one, 2,4,6-trimethylbenzoyldiphenylphosphine oxide, and the like.

These photopolymerization initiators are employed solely or in combination with others. If required, a sensitizer (photopolymerization promoter) of an amine compound can be used together to the extent that the same does not interfere the effect of the present invention. Beside photopolymerization initiators, thermal polymerization initiators may be used.

The polyetherpolyurethane having a tetramethyleneoxy structure which is contained in the component (a) according to the present invention (such polyetherpolyurethane is hereinafter referred to as "Polymer (a)"), can be prepared according to processes exemplified hereinbelow.

PROCESS 1

Reacting a specific ether type diol with a diisocyanate to obtain an intermediate compound, the functional group of which is then reacted with a compound having an ethylenically unsaturated group.

PROCESS 2

Reacting a diisocyanate with a compound having an ethylenically unsaturated group to obtain an intermediate compound, the functional group of which is then reacted with a specific ether type diol.

PROCESS 3

A diisocyanate, a specific ether type diol and a compound having an ethylenically unsaturated group are reacted altogether.

PROCESS 4

A specific ether type diol, an isocyanate group and a compound having an ethlenically unsaturated group are reacted.

Compounds having an ethylenically unsaturated group used in the above processes may be, for example, vinyl type, (meth)acryl type, (meth)acrylamide type, vinylether type, or vinylsulfide type compounds having an ethylenically unsaturated group, and other groups such as, for example, a hydroxyl group, amino group, isocyanate group, carboxyl group, acid halide group, epoxy group, or the like.

Compounds having an ethylenically unsaturated group and a hydroxyl group include, for example, 2-hydroxyethyl (meth)acrylate, 2-hydroxypropyl (meth)acrylate, 2-hydroxyoctyl (meth)acrylate, pentaerythritol tri(meth)acrylate, glycerin di(meth)acrylate, dipentaerythritolmonohydroxypenta (meth)acrylate, 1,4-butanediol mono(meth)acrylate, 4-hydroxycyclohexyl (meth)acrylate, 1,6-hexanediol mono(meth)acrylate, neopentyl glycol mono(meth)acrylate, trimethylolpropane di(meth)acrylate, trimethylolethane di(meth)acrylate; compounds obtained by the addition reaction of a compound having a glycidyl group such as glycidyl (meth)acrylate and (meth)acrylic acid; (meth)acrylates represented by the formulae:

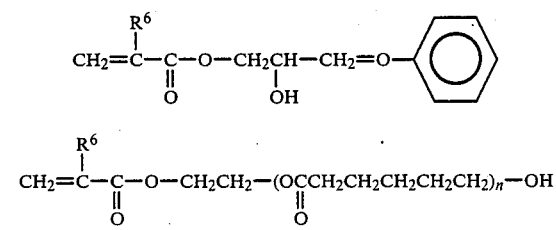

(in which $R^6$ represents a hydrogen atom or a methyl group and n is an integer of 1–5); N-methylol (meth)acrylamide, 2-hydroxyethyl vinylether, 2-hydroxyethyl vinylsulfide, and the like.

Examples of compounds having an ethylenically unsaturated group and an amino group are aminoethyl (meth)crylate, N-methylaminoethyl (meth)acrylate, N-ethylaminoethyl (meth)acrylate, (meth)acrylamide, N-tertoctylacrylamide, and the like.

As examples of compounds having an ethylenically unsaturated group and an isocyanate group, there are vinyl isocyanate, isopropenyl isocyanate, aryl isocyanate, and the like. (Meth)acrylic acids and the like are given as examples of compounds having an ethylenically unsaturated group and a carboxyl group; (meth)acrylic acid halides such as (meth)acrylic acid chloride and (meth)acrylic acid bromide are given as examples of compounds having an ethylenically unsaturated group and an acid halide group; and glycidyl (meth)acrylate, aryl glycidyl ether, N-vinylglycidyl urethane, N-isopropenylglycidyl urethane, vinylglycidyl ether, vinylglycidyl sulfide, and the like are given as examples of compounds having an ethylenically unsaturated group and an epoxy group.

Diisocyanates used in the above processes includes, for example, 2,4-toluenediisocyanate, 2,6-toluenediisocyanate, 1,3-xylenediisocyanate, 1,4-xylenediisocyanate, 1,5-naphthalenediisocynate, m-phenylenediisocyanate, p-phenylenediisocyanate, 3,3'-dimethyl-4,4'-diphenylmethanediisocyanate, 4,4'-diphenylmethanediisocyanate, 3,3'-dimethylphenylenediisocyanate, 4,4'-biphenylenediisocyanate, hexamethylenediisocyanate, isophorodiisocyanate, hydrogenated diphenylmethanediisocyanate, and the like. Among these preferable diisocyanates are 2,4-toluenediisocyanate, 2,6-toluenediisocyanate, hydrogenated diphenylmethanediisocyanate, isophoronediisocyanate, and the like. These isocyanates may be used solely, or two or more kinds may be used in combination.

A desirable embodiment of the above Process 1 is now described.

The amount of diisocyanate to be used per 1 equivalent of hyroxyl group contained in the specific ether type diol is about 0.5–2 mol. In this reaction, a catalyst such as copper naphthenate, cobalt naphthenate, zinc naphthenate, n-butyltin laurate, triethylamine, or the like is usually used in an amount of 0.01–1.0 part by weight per 100 parts by weight of the total amount of the reaction compounds. The reaction temperature is usually 0°–80° C.

The compound having an ethylenically unsaturated group is reacted with the functional group of the intermediate product thus prepared. The amount of the compound having an ethylenically unsaturated group to be used is about 1 mol per 1 equivalent of the functional group of said intermediate product. The same reaction conditions as used for preparing said intermediate product may be applied to this reaction.

A desirable embodiment of the above Process 2 is now described.

An intermediate compound is prepared by reacting 1 mol of an isocyanate compound with about 1 mol of a compound having an ethylenically unsaturated group under the same reaction conditions as the Process 1. Then, under this same reaction conditions a specific ether type diol is reacted with the intermediate compound at a proportion such that 1 equivalent of the functional group of said intermediate compound may be about 1 equivalent of the hydroxy group of the diol compound.

A desirable embodiment of the above Process 3 is now described.

Per 1 mol of a specific ether type diol 0.5–2 mols of a diisocyanate compound, and 0.5–2 mol of a compound having an ethylenically unsaturated group is reacted under the same reaction conditions as the Process 1.

In the above processes 1–3, a polyol other than bifunctional one and a polyisocyanate other than bifunctional one may be used for a diol or a diisocyanate, respectively, inasmuch as the product may not be gelled, and the amount of the polyol or polyisocyanate used may usually be in the range of 5 to 30 parts by weight per 100 parts by weight of diolor diisocyanate. The polyols other than bifunctional ones which can be used includes, for example, addition compounds of glycerol and propylene oxide, glycerol, 1,2,3-pentanetriol, 1,2,3-butanetriol, tri(2-hydroxypolyoxypropyl)-polysiloxane, polycaprolactonetriol, polycaprolactonetetraol, liquid polybutadiene having more than 2 hydroxyl groups in a molecule or a hydrogenated product thereof, and the like. Given as examples of polyisocyanate other than bifunctional one are polymethylene-polyphenyl isocyanate, triphenylmethane-4,4',4"-triisocyanate, and the like.

A desirable embodiment of the above Process 4 is now described.

One mol of a specific ether type diol compound is reacted with 2 mol of a compound having an isocyanate group and an ethylenically unsaturated group under the same conditions as those of the Process 1.

In the above processes 1–4, a diol other than the specific ether type diol, or a polyether type diol can be used together with a specific ether type diol.

The proportion of components (a), (b), and (c) in this invention is usually; for polyetherpolyurethane, the component (a), 20–85%, preferably 40–80%; for ethylenically unsaturated monomer, the component (b), 5–70%, preferably 15–60%; and for the polymerization initiator, the component (c), 0.1–10%, preferably 1–5%.

The bundling composition of this invention may be compounded with various additives, such as, for example, aging preventives, preservatives, ultraviolet absorbents, surface active agents, leveling agents, coloring agents, amines, silane coupling agents, and the like. The amount compounded is usually less than 10% by weight for each of the additives.

The bundling composition of this invention thus prepared has a viscosity usually of 1,000–20,000 cps/25° C., with preferable range being 2,000–10,000 cps/25° C. The coefficient of dynamic friction between the cured material of the bundling composition of this invention and polyethylene as determined according to ASTM-D 1894 is not more than 0.4, preferably not more than 0.35, and most preferably not more than 0.3. If the value of the coefficient of dynamic friction exceeds 2.5, the problem of increased transmission loss of the optical fiber cable occurs.

Also, the coefficient of static friction between the cured material of the bundling composition of this invention and polyethylene is not more than 1.1, preferably not more than 1.0. The coefficient of static friction between the cured materials of the bundling composition of this invention is usually not more than 3.0, and preferably not more than 2.5. The coefficient of static friction between the cured materials of the bundling composition of this invention after they have been thermally treated is usually not more than 4.0, and preferably not more than 3.5.

[EXAMPLES]

The present invention is now illustrated in detail by way of examples, which shall by no means be construed as limiting the scope of the invention.

PREPARATION EXAMPLE 1

A reaction vessel was charged with 674 gm of 2,4-tolylenediisocyanate, 5 gm of dibutyltin dilaurate, and 1 gm of 2,6-di-tert-butyl-4-methylphenol. Added to the mixture was 3876 gm of polytetramethylene glycol with an number average molecular weight of 2,000 (PTMG 2000, manufactured by Mitsubishi Chemical Industries, Ltd.) in 3 hours while controlling the temperature inside the vessel at 60°–70° C.

After addition of polytetramethylene glycol the reaction mixture was stirred for 1 hour at 60°–70° C., was further added with 450 gm of 2-hydroxyethyl acrylate in 1 hour at 60°–70° C., and held at this temperature for 3 hours to complete the reaction.

The polyetherpolyurethane thus prepared is referred to as PU-1.

PREPARATION EXAMPLE 2

A polycaprolactonepolyurethane was prepared following the same method as in the Preparation Example 1, but for using polycaprolactone with a number average molecular weight of 2,000 (Placcell 212AL manufactured by Daicel Co., Ltd.) instead of polytetramethylene glycol.

The polycaprolactonepolyurethane thus prepared is referred to as PU-2.

PREPARATION EXAMPLE 3

A polyetherpolyurethane was prepared following the same method as in the Preparation Example 1, but for using a polypropylene glycol having a number average molecular weight of 2,000 (EXENOL 2020 manufactured by Asahi Olin Co., Ltd.) instead of polytetramethylene glycol.

The polyetherpolyurethane thus prepared is referred to as PU-3.

PREPARATION EXAMPLE 4

A polyetherpolyurethane was prepared following the same method as in the Preparation Example 1, but for using a ring-opened copolymer diol of propylene oxide and tetrahydrofuran at a 3/7 ratio by weight and having a number average molecular weight of 2,000 (PPTG 2000 manufactured by Hodogaya Chemical Co., Ltd.) instead of polytetramethylene glycol.

The polyetherpolyurethane thus prepared is referred to as PU-4.

PREPARATION EXAMPLE 5

A reaction vessel was charged with 778 gm of tricyclodecanedimethanol diacrylate, 389 gm of vinylpyrrolidone, 720 gm of 2,4-tolylenediisocyanate, 4 gm of dibutyltin dilaurate, and 1 gm of 2,6-di-tert-butyl-4-methylphenol. Added to the mixture was 320 gm of hydroxyethyl acrylate while ice-cooling the vessel so as to control the temperature inside the vessel at below 20° C., and stirring the mixture.

After addition of hydroxyethyl acrylate the reaction mixture was stirred for 1 hour at 5°–20° C., was further added with 85 gm of ethylene glycol, and then 2,759 of polytetramethylene glycol with an number average molecular weight of 2,000 (PTMG 2000, manufactured by Mitsubishi Chemical Industries, Ltd.) at a temperature of below 60° C.

After the addition the mixture was held at a temperature of 50°-60° C. and stirred for 3 hours to complete the reaction. A polyetherpolyurethane/ethylenically unsaturated monomer mixture constituted by polyetherpolyurethane/tricyclodecanedimethanol diacrylate/vinylpyrrolidone at a ratio of 10/2/1 was thus obtained.

The polyetherpolyurethane in the mixture thus prepared is referred to as PU-5.

PREPARATION EXAMPLE 6

A polyetherpolyurethane/ethylenically unsaturated monomer mixture constituted by polyetherpolyurethane/tricyclodecanedimethanol diacrylate/vinylpyrrolidone at a ratio of 10/2/1 was prepared following the same method as in Preparation Example 5, but for using 2,139 gm of polytetramethylene glycol with an number average molecular weight of 1,000 (PTMG 1000, manufactured by Mitsubishi Chemical Industries, Ltd.) instead of polytetramethylene glycol with an number average molecular weight of 2,000, and changing the amount of 2,4-tolylenediisocyanate, hydroxyethyl acrylate, and ethylene glycol to 1,116 gm, 496 gm, and 133 gm, respectively.

The polyetherpolyurethane in the mixture thus prepared is referred to as PU-6.

PREPARATION EXAMPLE 7

A reaction vessel was charged with 1,776 gm of 2,4-tolylenediisocyanate, 5 gm of dibutyltin dilaurate, 1.5 gm of 2,6-di-tert-butyl-4-methylphenol, and 1,250 gm of tricyclodecanedimethanol diacrylate. Added to the mixture was 2041 gm of ethylene oxide adduct of bisphenol A with an number average molecular weight of 400 (DA 400, manufactured by Japan Oil and Fat Co., Ltd.) in 2 hours while controlling the temperature inside the vessel at 60°-70° C.

After addition of ethylene oxide adduct of bisphenol A the reaction mixture was stirred for 1 hour at 60°-70° C., was further added with 1,184 gm of 2-hydroxyethyl acrylate in 1 hour at 60°-70° C., and held at this temperature for 3 hours to complete the reaction. A polyetherpolyurethane/ethylenically unsaturated monomer mixture constituted by polyetherpolyurethane/tricyclodecanedimethanol diacrylate at a ratio of 4/1 was thus obtained.

The polyehterpolyurethane in the mixture thus prepared is referred to as PU-7.

PREPARATION EXAMPLE 8

A reaction vessel was charged with 1,155 gm of isobornyl acrylate, 1,648 gm of 2,4-tolylenediisocyanate, 4 gm of dibutyltin dilaurate, and 1 gm of 2,6-di-tert-butyl-4-methylphenol. Added to the mixture was 2197 gm of hydroxyethyl acrylate while stirring and controlling the temperature inside the vessel below 50° C. After the addition the mixture was held at a temperature of 60°-70° C. and stirred for 3 hours to complete the reaction.

Analysis by gel permeation chromatography and mass spectrometry revealed that the product obtained was a mixture of a vinylurethane, which is the reaction product of 1 mol of tolylenediisocyanate and 2 mol of hydroxyethyl acrylate, and isobornyl acrylate at a ratio by weight of 10/3.

The vinylurethane in the mixture thus prepared is referred to as UM-1.

EXAMPLES 1-6

Bundling compositions as shown in Table 1 were prepared and were subjected to the tests described below in order to evaluate their characteristics.

Mixing of polyetherpolyurethanes, polycaprolactonepolyurethanes, ethylenically unsaturated monomers and photopolymerization initiators was carried out at a temperature of 50°-60° C. for 2 hours so as to obtainhomogeneous fluid compositions.

(Test Method)

Test specimens were prepared using the fluid composition and according to the following procedure, and were subjected to the tests as described below.

(1) Preparation of test specimen

The composition was coated on a glass plate by means of an applicator of 250 μm thickness and was cured by irradiating ultraviolet rays (wave length: 350 mm) of 1 J/cm$^2$. The cured film thus prepared was peeled off from the glass plate and conditioned at 23° C. and relative humidity of 50% for 23 hours, to serve it as a test specimen.

(2) Measurement of Young's modulus and breaking elongation

Young's modulus and breaking elongation of the above test specimen were measured by means of a thermostat tensile tester at −40° C., 23° C. and 60° C. A rate of pulling and bench mark width were 1 mm/min and 25 mm for Young's modulus and 50 mm/min and 25 mm for breaking elongation, respectively.

(3) Evaluation of thermal resistance and hot-water resistance

The above test specimens were left over for three months in a thermostat at 80° C. and in water at 80° C. After that, Young's modulus and breaking elongation each at 23° C. were measured on each of the specimens according to the manners as described in (2) above. Those specimens of which proportion of changes in Young's modulus and breaking elongation as against the initial value were not more than ±30% were judged as "accepted", and those more than ±30% were judged as "failed".

(4) Evaluation of the surface conditions by means of a friction coefficient measurement The composition was coated on a glass plate by means of an applicator of 250 μm thickness and was cured by irradiating ultraviolet rays (wave length: 350 nm) of 0.5 J/cm$^2$. Coefficients of static friction and dynamic friction between the cured film thus prepared and polyethylene (Hyzex 6300M manufactured by Mitsui Petrochemical Co., Ltd.) and coefficient of static friction between the cured films were measured according to ASTM-D 1984.

In addition, the cured film was thermally treated at 100° C. for 24 hours, and after that the coefficient of static friction was measured according to the same method as above. The results are shown in Table 1.

(Results)

Results are shown in Table 1, in which following abbreviations are applicable:

SA-1002: tricyclodecanedimethanol diacrylate
EA-1370: epoxy acrylate of the following structure:

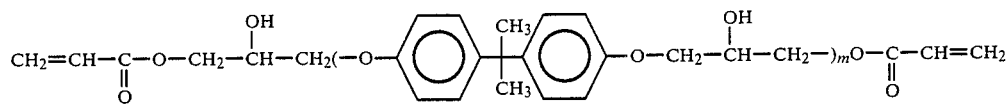

in which m denotes a value of 1-2.
IRG184: 1-hydroxycyclohexylphenyl ketone
ACP: accepted
FLD: failed

[EFFECT OF THE INVENTION]

The curable bundling composition for optical fiber according to the present invention has the following effects:
(1) The resin is rapidly curable and provides good productivity.
(2) The cured material has a sufficient strength and flexibility.
(3) The cured material exhibits only small variations in its properties over a wide range of temperature.
(4) The cured material exhibits only small changes in its properties upon lapse of time and thus possesses a long-use reliability.
(5) The cured material has a good resistance against chemicals such as acids, alkalis or the like.
(6) The cured material has only a low moisture and water absorptivity.
(7) The cured material has a smooth surface with a small friction coefficient.

Thus, the composition is suitable for bundling element strands of optical fiber to form a tape-like structure. Beside this tape-like structure, the curable bundling composition for optical fiber of this invention can be suitabley used as a material for making a circular unit of plurality of optical fiber element strands around a high tensile wires.

TABLE 1

| Composition | Examples | | | | | | Comparative Example | | |
|---|---|---|---|---|---|---|---|---|---|
| | 1 | 2 | 3 | 4 | 5 | 6 | 1 | 2 | 3 |
| Polyetherpolyurethane | | | | | | | | | |
| PU-1 | 43 | 31 | 29 | | | | | | |
| PU-2 | | | | | | | 43 | | |
| PU-3 | 7 | | | | | | 7 | 31 | 24 |
| PU-4 | | 3 | 3 | | | | | 3 | |
| PU-5 | | | | 43 | | 38 | | | |
| PU-6 | | | | | 48 | | | | 24 |
| PU-7 | | 19 | 19 | | | | | 19 | |
| Proportion of tetra-methyleneoxy structure in polyetherpolyurethane (wt %) | 67 | 48 | 47 | 71 | 55 | 71 | 0 | 1.6 | 28 |
| Ethylenically unsaturated monomer | | | | | | | | | |
| Isobornyl acrylate | 12 | 10 | 9 | 16 | 20 | 13 | 12 | 10 | 20 |
| vinyl pyrrolidone | 9 | 8 | 8 | 7 | 10 | 7 | 9 | 8 | 10 |
| UM-1 | 13 | 6 | 15 | 15 | | 24 | 13 | 6 | |
| SA-1002 | 13 | 13 | 14 | 16 | 19 | 15 | 13 | 13 | 19 |
| EA-1370 | | 7 | | | | | | 7 | |
| Photopolymerization Initiator | | | | | | | | | |
| IRG-184 | 3 | 3 | 3 | 3 | 3 | 3 | 3 | 3 | 3 |
| Characteristics | | | | | | | | | |
| 1. Young's modulus (kg/cm$^2$) | | | | | | | | | |
| at 23° C. | 51 | 62 | 77 | 45 | 61 | 60 | 63 | 65 | 51 |
| at −40° C. | 142 | 159 | 173 | 128 | 174 | 148 | 210 | 208 | 188 |
| at 60° C. | 20 | 27 | 33 | 18 | 21 | 25 | 13 | 15 | 12 |
| 2. Breaking elongation (%) at 23° C. | 58 | 50 | 48 | 65 | 62 | 45 | 45 | 50 | 65 |
| 3. Thermal resistance (at 80° C. for 3 months) | ACP | ACP | ACP | ACP | ACP | ACP | FLD | FLD | FLD |
| 4. Hot water resistance (at 80° C. for 3 months) | ACP | ACP | ACP | ACP | ACP | ACP | FLD | FLD | FLD |
| Coefficients of Dynamic Friction | 0.30 | 0.22 | 0.21 | 0.26 | 0.25 | 0.28 | 0.53 | 0.49 | 0.52 |
| Static Friction (with polyethylene) | 0.93 | 0.80 | 0.80 | 0.85 | 0.83 | 0.92 | 1.55 | 1.29 | 1.36 |
| Coefficient of Static Friction (between cured films) | 2.0 | 1.7 | 1.7 | 2.0 | 1.9 | 1.9 | 6.5 | 3.3 | 3.5 |
| Coefficient of Static Friction after thermal treatment (between cured films) | 2.0 | 1.8 | 1.9 | 2.0 | 2.0 | 1.9 | 7.2 | 4.7 | 4.9 |

What is claimed is:
1. A curable resin composition adapted for bundling coated optical fibers which comprises:
(A) polyetherpolyurethanes of at least one kind having an ethylenically unsaturated group and contain- ing from 40% to 85%, by weight, of a tetramethyleneoxy structure in the entire structure thereof;

(B) ethylenically unsaturated monomer; and (C) a photopolymerization initiator, said resin composition, when cured, having a coefficient of dynamic friction with polyethylene of not more than 0.4.

2. A resin composition as recited in claim 1 in which said polyetherpolyurethane is made by the reaction of organic diisocyanate, monohydric acrylate and glycol containing repeating tetramethyleneoxy groups.

3. A resin composition as recited in claim 2 in which said polyetherpolyurethane has a molecular weight in the range of 3,000 to 8,000.

4. A resin composition as recited in claim 3 in which said monohydric acrylate is 2-hydroxyethyl acrylate.

5. A resin composition as recited in claim 3 in which said ethylenically unsaturated monomer comprises vinyl pyrrolidone and isobornyl acrylate.

6. A resin composition as recited in claim 1 in which said monohydric acrylate is 2-hydroxyethyl acrylate.

7. A resin composition as recited in claim 1 in which said polyetherpolyurethane has a molecular weight in the range of 1,000 to 10,000.

8. A resin composition as recited in claim 1 in which said ethylenically unsaturated monomer comprises vinyl pyrrolidone.

9. A resin composition as recited in claim 1 in which said ethylenically unsaturated monomer comprise isobornyl acrylate.

10. A bundle of parallel coated optical fibers held together by the cured resin composition of claim 1.

11. A bundle of parallel coated optical fibers as recited in claim 10 in which said fibers are aligned on a plane and held together by said cured resin composition to form a tape-like structure having a rectangular cross-section.

12. A curable resin composition adapted for bundling coated optical fibers which comprises:

(A) from 20% to 85% of polyetherpolyurethanes of at least one kind having an ethylenically unsaturated group and containing from 40% to 85%, by weight, of a tetramethyleneoxy structure in the entire structure thereof, said polyetherpolyurethanes being made by the reaction of organic diisocyanate, monohydric acrylate and glycol containing repeating tetramethyleneoxy groups;

(B) from 5% to 70% of ethylenically unsaturated monomer; and (C) from 0.1% to 10% of a photopolymerization initiator, said resin composition, when cured, having a coefficient of dynamic friction with polyethylene of not more than 0.4.

13. A resin composition as recited in claim 12 in which said polyetherpolyurethanes are present in from 40% to 80%, and said ethylenically unsaturated monomer is present in from 15% to 60%, and said initiator is present in from 1% to 5%.

14. A resin composition as recited in claim 13 in which said polyetherpolyurethane has a molecular weight in the range of 3,000 to 8,000.

15. A bundle of parallel coated optical fibers held together by the cured resin composition of claim 14.

16. A bundle of parallel coated optical fibers held together as recited in claim 14.

* * * * *

UNITED STATES PATENT AND TRADEMARK OFFICE
CERTIFICATE OF CORRECTION

PATENT NO. : 4,844,604
DATED : July 4, 1989
INVENTOR(S) : Bishop et al

It is certified that error appears in the above-identified patent and that said Letters Patent is hereby corrected as shown below:

Col. 2, line 38, "polyetherpolurethanes" should be --polyetherpolyurethanes--.
Col. 2, lines 43 and 44, "(meth-)acryloyl" should be --(meth)-acryloyl--.
Col. 2, lines 57 and 58, "polyetherpol-yurethanes" should be --polyetherpoly-urethanes--.
Col. 2, lines 61 and 62, "polyetherpol-yurethane" should be --polyetherpoly-urethane--.
Col. 2, line 64, after the word "diols" insert --"--.
Col. 3, line 9, "preferably" should be --preferable--.
Col. 3, lines 30 and 31, "(meth-)acrylate" should be --(meth)-acrylate--.
Col. 4, lines 14 and 15, "tri(-meth)acrylate" should be --tri-(meth)acrylate--.
Col. 4, lines 16 and 17, "di(-meth)acrylate" should be --di-(meth)acrylate--.
Col. 4, lines 18-19, "di(-meth)acrylate" should be --di-(meth)acrylate--.
Col. 4, lines 24 and 25, "epoxy(-meth)acrylate" should be --epoxy-(meth)acrylate--.
Col. 4, lines 41 and 42, "(meth-)acrylate" should be --(meth)-acrylate--.
Col. 6, line 5, "(meth)crylate" should be --(meth)acrylate--.
Col. 7, line 15, "diolor" should be --diol or--.
Col. 10, line 14, "obtainhomogeneous" should be --obtain homogeneous--.
Col. 10, line 58, "1984" should be --1894--.

Signed and Sealed this

Twenty-fifth Day of September, 1990

Attest:

HARRY F. MANBECK, JR.

*Attesting Officer*     *Commissioner of Patents and Trademarks*